(12) United States Patent
Wu (10) Patent No.: US 11,706,670 B2
(45) Date of Patent: Jul. 18, 2023

(54) TRANSFERRING A RADIO BEARER CONFIGURATION (71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/531,499

(22) Filed: Aug. 5, 2019

(65) Prior Publication Data
US 2020/0045592 A1 Feb. 6, 2020

Related U.S. Application Data (60) Provisional application No. 62/715,061, filed on Aug. 6, 2018.

(51) Int. Cl.
H04W 36/00 (2009.01)
H04W 36/14 (2009.01)
H04W 36/08 (2009.01)

(52) U.S. Cl.
CPC ....... H04W 36/0055 (2013.01); H04W 36/08 (2013.01); H04W 36/14 (2013.01)

(58) Field of Classification Search
CPC ............. H04W 36/04; H04W 36/0055; H04W 36/0069; H04W 36/08; H04W 36/14
See application file for complete search history.

(56) References Cited

U.S. PATENT DOCUMENTS

2013/0084864 A1* 4/2013 Agrawal ......... H04W 36/00837
455/436
2014/0018085 A1* 1/2014 Young ............... H04W 52/0216
455/450

(Continued)

FOREIGN PATENT DOCUMENTS

| JP | 2017038403 | 2/2017 |
|---|---|---|
| KR | 20180083262 | 7/2018 |
| RU | 2474077 | 1/2013 |
| WO | 2018029933 | 2/2018 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC);", 3GPP TS 36.331 V15.2.2, Jun. 2018. (Year: 2018).*

(Continued)

Primary Examiner — Khoa Huynh
(74) Attorney, Agent, or Firm — Colby Nipper PLLC (57) ABSTRACT This document describes methods, devices, systems, and means for the transfer of radio bearer (RB) configurations from a Fifth Generation (5G) New Radio (NR) base station (121) to an Evolved Universal Terrestrial Radio Access (E-UTRA) base station (122). The 5G NR base station (121) configures an RB configuration to configure an RB for communication of Protocol Data Units between the 5G NR base station (121) and a user equipment (111). The 5G NR base station (121) determines to hand over the user equipment (111) to an Evolved Universal Terrestrial Radio Access (E-UTRA) base station and sends a Handover Request message for the user equipment (111) to the E-UTRA base station (122). The 5G NR base station (121) receives a Handover Request Acknowledge message from the E-UTRA base station (122) and transmits a 5G NR Radio Resource Control (RRC) message including an E-UTRA RRC message to the user equipment (111).

20 Claims, 5 Drawing Sheets (56) References Cited

U.S. PATENT DOCUMENTS

| | | | |
|---|---|---|---|
| 2015/0358865 A1 | 12/2015 | Fu et al. | |
| 2016/0057660 A1 | 2/2016 | Hong et al. | |
| 2016/0080997 A1 | 3/2016 | Hu et al. | |
| 2018/0199355 A1 | 7/2018 | Wu | |
| 2018/0227816 A1 | 8/2018 | Wu | |
| 2018/0368039 A1* | 12/2018 | Wu | H04W 8/20 |
| 2019/0098544 A1 | 3/2019 | Han et al. | |
| 2019/0159021 A1* | 5/2019 | Zhao | H04W 28/0252 |
| 2019/0261234 A1* | 8/2019 | Park | H04W 36/0069 |
| 2019/0261240 A1* | 8/2019 | Fang | H04W 68/005 |
| 2019/0335365 A1* | 10/2019 | Ying | H04W 36/10 |
| 2019/0335521 A1* | 10/2019 | Shi | H04W 80/08 |
| 2019/0357076 A1* | 11/2019 | Han | H04W 72/042 |
| 2020/0053814 A1* | 2/2020 | Minokuchi | H04L 47/24 |
| 2022/0159529 A1* | 5/2022 | Han | H04W 36/0061 |

OTHER PUBLICATIONS

"Data Forwarding for Inter-System Inter-RAT Handover from 5GS to EPS", 3GPP TSG-RAN WG3 Meeting #97; Agenda Item: 10.7.3; R3-172974, Aug. 21-25, 2017, 6 pages.
"Draft CR on 36.331 UE Context Handling During Handover to LTE-5GC", 3GPP TSG-WG2 Meeting #103; Change Request 36.331 CR CRNum rev—Current Version 15 2.2; R2-1811568, Aug. 20-24, 2018, 4 pages.
"HandoverPreparationInformation (G201)", 3GPP TSG-WG2 Meeting #103; Change Request; 36.331 CR rev—Current version: 15.2.0; R2-1812903, Aug. 20-24, 2018, 6 pages.
"International Search Report and Written Opinion", PCT Application No. PCT/US2019/044484, dated Sep. 30, 19, 39 pages.
"Radio Resource Control (RRC); Protocol Specification", 3GPP TS 38.331 version 15.4.0 Release 15, Apr. 2019, 471 pages.
"International Preliminary Report on Patentability", Application No. PCT/US2019/044484, dated Feb. 9, 2021, 30 pages.
"NG Application Protocol (NGAP)", (3GPP TS 38.413 version 15.0.0 Release 15), Jul. 2018, 256 pages.
"Foreign Office Action", RU Application No. 2021103365, dated Mar. 9, 2021, 5 pages.
"Foreign Notice of Allowance", RU Application No. 2021103365, dated Sep. 28, 2021, 22 pages.
"Foreign Office Action", IN Application No. 202147003999, dated Jan. 11, 2022, 6 pages.
"Foreign Notice of Allowance", RU Application No. 2021135308, dated May 25, 2022, 25 pages.
"Lossless Handover", 3GPP TSG-RAN WG2 Meeting #102—R2-1808325, May 2018, 2 pages.
"Foreign Office Action", EP Application No. 19752849.0, dated Jan. 10, 2023, 19 pages.

* cited by examiner

TRANSFERRING A RADIO BEARER CONFIGURATION

BACKGROUND

The evolution of wireless communication to fifth generation (5G) standards and technologies provides higher data rates and greater capacity with improved reliability and lower latency, which enhances mobile broadband services. 5G technologies also provide new classes of service for vehicular networking, fixed wireless broadband, and the Internet of Things (IoT).

As 5G networks are deployed, Evolved Universal Terrestrial Radio Access (E-UTRA) networks will provide broader areas of coverage and fill gaps in 5G network deployments. Inter-radio access technology handovers for user equipment are required to provide 5G and E-UTRA interoperability. However, a source Fifth Generation New Radio (5G NR or NR) base station does not include a radio bearer (RB) configuration of 5G NR RBs in a Handover Preparation Information message for a handover of a user equipment (UE) from the source 5G NR base station to a target E-UTRA base station. Thus, the target E-UTRA base station does not know whether a data RB (DRB) is configured or the number of DRBs that are configured by the source 5G NR base station. Consequently, the target E-UTRA base station cannot configure an E-UTRA configuration for an RB and the UE cannot continue to use the RB and the target E-UTRA base station after the handover. Without the RB configuration for NR, the target E-UTRA base station can only configure a new DRB, which can cause a service interruption due to change of the DRB.

SUMMARY

This summary is provided to introduce simplified concepts of transferring a radio bearer configuration. The simplified concepts are further described below in the Detailed Description. This summary is not intended to identify essential features of the claimed subject matter nor is it intended for use in determining the scope of the claimed subject matter.

In an aspect, methods, devices, systems, and means for transferring a radio bearer configuration are described, in which a fifth-generation base station applies at least one radio bearer configuration to configure at least one radio bearer for communication of Protocol Data Units between the fifth-generation base station and a user equipment. The fifth-generation base station determines to hand over the user equipment to an Evolved Universal Terrestrial Radio Access base station, and based on the determination to hand over the user equipment, sends a Handover Request message including a Handover Preparation Information message to the Evolved Universal Terrestrial Radio Access base station, the Handover Preparation Information message including the at least one radio bearer configuration. In response to sending the Handover Request message, the fifth-generation base station receives a Handover Request Acknowledge message from the Evolved Universal Terrestrial Radio Access base station that includes a radio bearer configuration based in part on the at least one radio bearer configuration and transmits a Radio Resource Control message including an Evolved Universal Terrestrial Radio Access Radio Resource Control message to the user equipment that is effective to cause the user equipment to perform a handover to the Evolved Universal Terrestrial Radio Access base station.

In another aspect, methods, devices, systems, and means for transferring a radio bearer configuration are described, in which a fifth-generation base station applies at least one radio bearer configuration to configure at least one radio bearer for communication of Protocol Data Units between the fifth-generation base station and a user equipment. The fifth-generation base station determines to hand over the user equipment to an Evolved Universal Terrestrial Radio Access base station, and based on the determining to hand over the user equipment, sends a Handover Required message including a Handover Preparation Information message for the user equipment to an Access and Mobility Management Function, the Handover Preparation Information message including the at least one radio bearer configuration. In response to sending the Handover Required message, the fifth-generation base station receives a Handover Command message from the Access and Mobility Management Function that includes a radio bearer configuration based in part on the at least one radio bearer configuration. The fifth-generation base station transmits a Radio Resource Control message including an Evolved Universal Terrestrial Radio Access Radio Resource Control message to the user equipment that is effective to cause the user equipment to perform a handover to the Evolved Universal Terrestrial Radio Access base station.

In a further aspect, methods, devices, systems, and means for transferring a radio bearer configuration are described, in which a user equipment receives at least one radio bearer configuration to configure at least one radio bearer for communication of Protocol Data Units between a fifth-generation base station and the user equipment. The user equipment receives a Radio Resource Control message including an Evolved Universal Terrestrial Radio Access Radio Resource Control message from the fifth-generation base station, the Evolved Universal Terrestrial Radio Access Radio Resource Control message including a Radio Link Control configuration. Based on the received Radio Resource Control message, the user equipment configures for a handover to an Evolved Universal Terrestrial Radio Access base station and transmits an Evolved Universal Terrestrial Radio Access Radio Resource Control response message to the Evolved Universal Terrestrial Radio Access base station.

BRIEF DESCRIPTION OF THE DRAWINGS

Aspects of transferring a radio bearer configuration are described with reference to the following drawings. The same numbers are used throughout the drawings to reference like features and components.

DETAILED DESCRIPTION

Overview

This document describes methods, devices, systems, and means for the transfer of radio bearer (RB) configurations from a Fifth Generation (5G) New Radio (NR) base station (fifth-generation base station) to an Evolved Universal Terrestrial Radio Access (E-UTRA) base station. As 5G networks are deployed, E-UTRA networks will provide broader areas of coverage and fill gaps in 5G network deployments. Inter-radio access technology handovers for user equipment are required to provide 5G and E-UTRA interoperability. However, a source Fifth Generation New Radio (5G NR or NR) base station does not include a radio bearer (RB) configuration for 5G NR RBs in a Handover Preparation Information message (e.g., a HandoverPreparationInformation message) for a handover of a user equipment (UE) from the source 5G NR base station to a target E-UTRA base station.

By including an existing 5G NR RB configuration in an LTE Handover Preparation Information message, the target E-UTRA base station will know the existing 5G NR RB configuration (e.g., whether a data RB (DRB) is configured or the number of DRBs that are configured by the source 5G NR base station). Consequently the target E-UTRA base station can configure an E-UTRA configuration for an RB, based on the 5G NR RB configuration, and the UE can continue to use the RB and the target E-UTRA base station after the handover, avoiding a service interruption due to a change of the RB.

While features and concepts of the described methods, devices, systems, and means for transferring a radio bearer configuration can be implemented in any number of different environments, systems, devices, and/or various configurations, aspects of the transferring a radio bearer configuration are described in the context of the following example devices, systems, and configurations.

Example Environment

Figure 1:
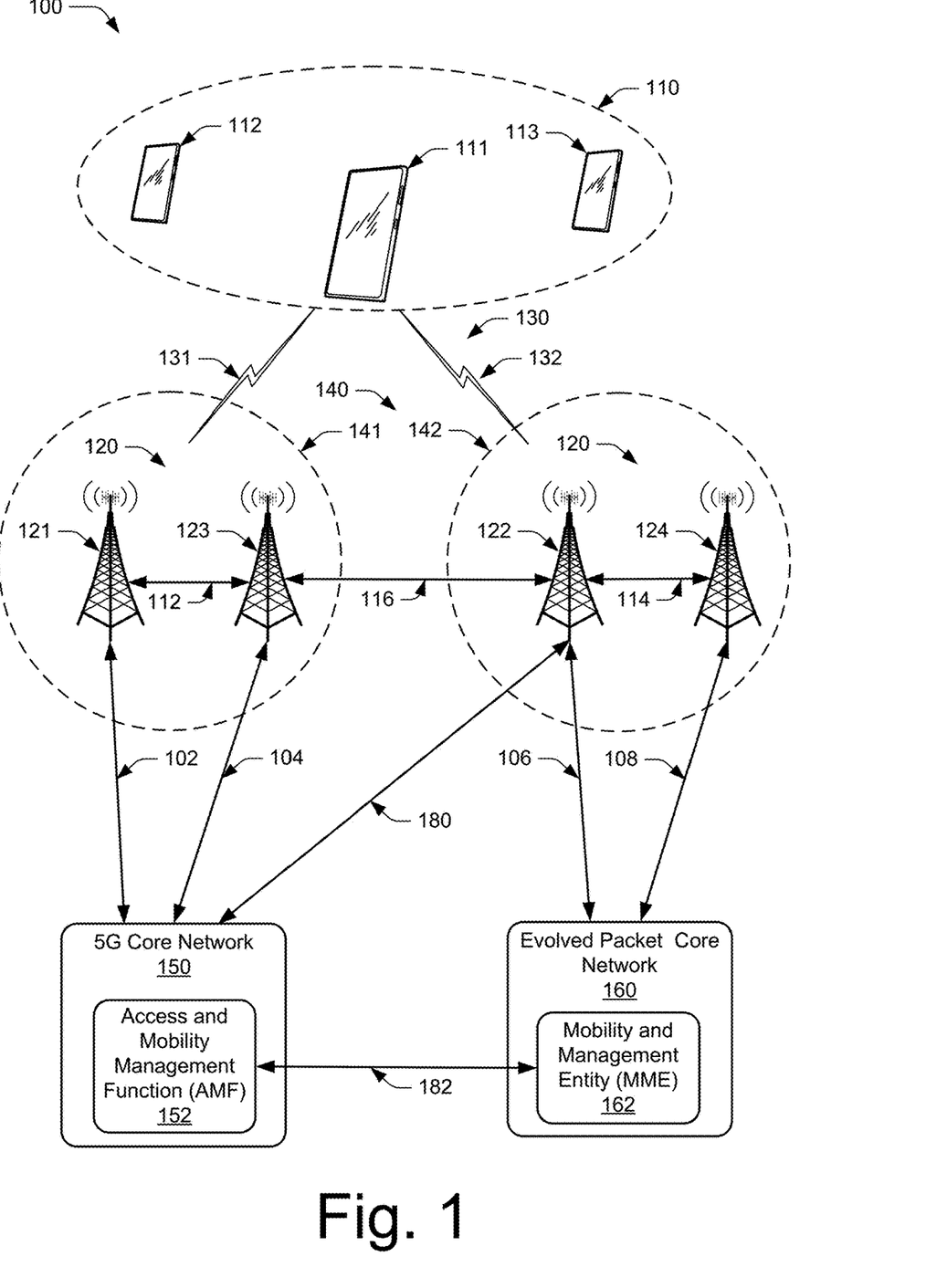
FIG. 1 illustrates an example wireless network environment in which various aspects of transferring a radio bearer configuration can be implemented.

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121, 122, 123, and 124) through one or more wireless communication links 130 (wireless link 130), illustrated as wireless links 131 and 132. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access base station, an Evolved Universal Terrestrial Radio Access Network Node B, E-UTRAN Node B, evolved Node B, eNodeB, eNB, a fifth-generation base station, 5G NR base station, Next Generation Node B, gNode B, gNB, or the like) may be implemented in a macrocell, microcell, small cell, picocell, or the like, or any combination thereof.

The base stations 120 communicate with the UE 110 via the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as a NR RAN 141 and an E-UTRAN 142. The base stations 121 and 123 in the NR RAN 141 are connected to a Fifth Generation Core 150 (5GC 150) network. The base stations 121 and 123 are referred to herein as fifth-generation base stations or 5G base stations or 5G NR base stations. The base stations 122 and 124 in the E-UTRAN 142 are connected to an Evolved Packet Core 160 (EPC 160). Optionally or additionally, the base station 122 may connect to both the 5GC 150 and EPC 160 networks. The base station 124 is referred to herein as an Evolved Universal Terrestrial Radio Access base station or E-UTRA base station.

The base stations 121 and 123 connect, at 102 and 104 respectively, to the 5GC 150 via an NG2 interface for control-plane signaling and via an NG3 interface for user-plane data communications. The base stations 122 and 124 connect, at 106 and 108 respectively, to the EPC 160 via an Si interface for control-plane signaling and user-plane data communications. Optionally or additionally, if the base station 122 connects to the 5GC 150 and EPC 160 networks, the base station 122 connects to the 5GC 150 via an NG2 interface for control-plane signaling and via an NG3 interface for user-plane data communications, at 180.

In addition to connections to core networks, base stations 120 may communicate with each other. The base stations 121 and 123 communicate via an Xn interface at 112. The base stations 122 and 124 communicate via an X2 interface at 114.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110, via the base stations 120. The AMF 152 and the MME 162 communication with each other via an N26 interface 182.

Example Devices

Figure 2:
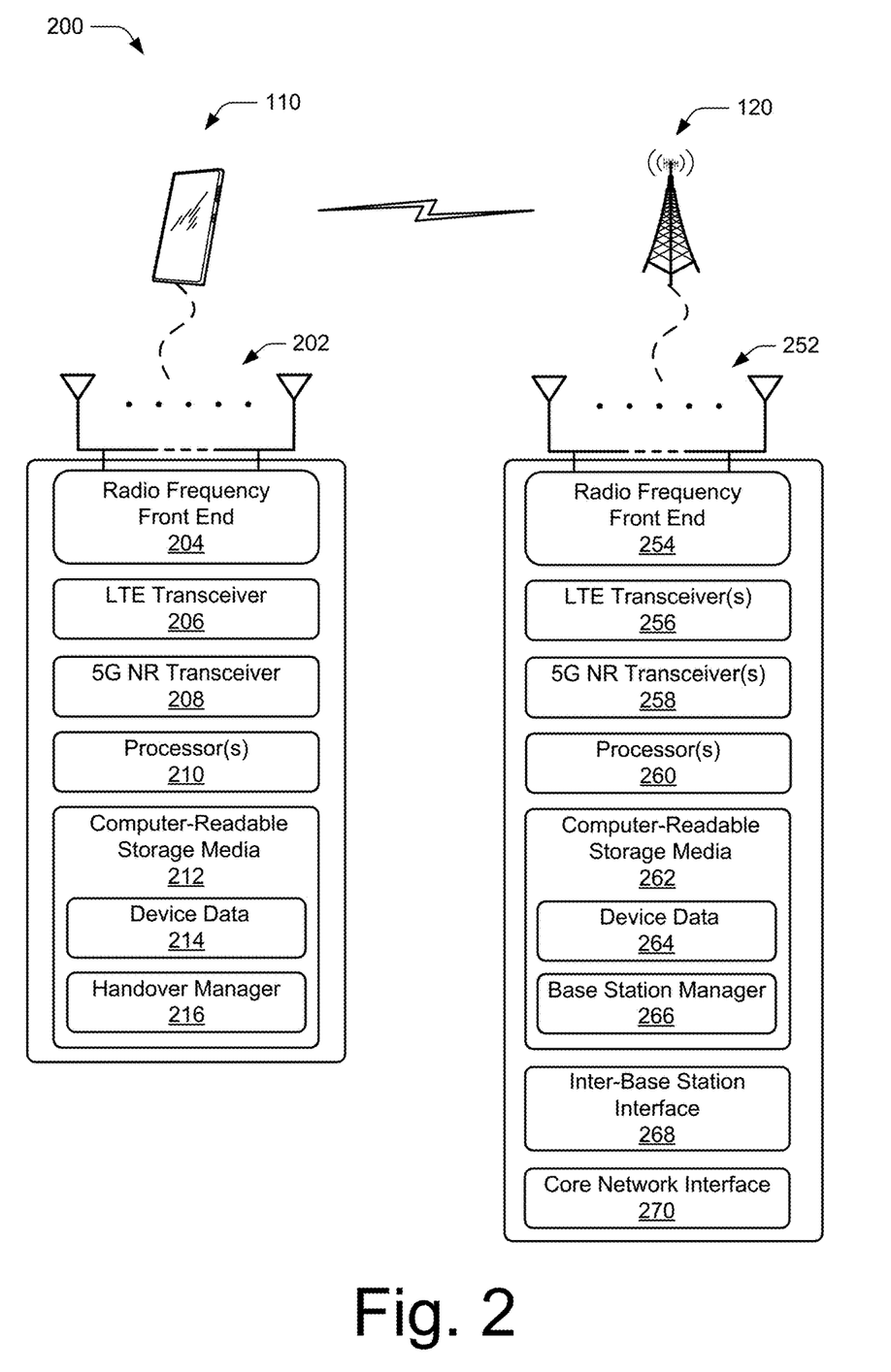
FIG. 2 illustrates an example device diagram for devices that can implement various aspects of transferring a radio bearer configuration.

FIG. 2 illustrates an example device diagram 200 of the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), at least one wireless transceiver, such as an LTE transceiver 206, and a 5G NR transceiver 208, for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

CRM 212 also includes a handover manager 216 (e.g., handover manager application). Alternately or additionally, the handover manager 216 may be implemented in whole or part as hardware logic or circuitry integrated with or separate from other components of the UE 110. In at least some aspects, the handover manager 216 configures the RF front end 204, the LTE transceiver 206, and/or the 5G NR transceiver 208 to implement the techniques for an uplink handover pilot described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more wireless transceivers, such as one or more LTE transceivers 256, and/or one or more 5G NR transceivers 258, for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266 (e.g., a base station manager application). Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Transferring a Radio Bearer Configuration

In an aspect, to communicate protocol data units (PDUs) using at least one radio bearer (RB) to the UE 111, the fifth-generation (hereinafter 5G) base station 121 configures the at least one RB based on at least one RB configuration. The 5G base station 121 transmits PDUs via the at least one RB to the UE 111. When the 5G source base station 121 determines to hand over the UE 111 to the E-UTRA target base station 122, the 5G source base station 121 sends a Handover Request message for the UE 111 to the E-UTRA target base station 122, via the Xn interface shown at 112 and 116. The Handover Request message includes a Handover Preparation Information message (e.g., a Handover-PreparationInformation message) and the Handover Preparation Information message includes the at least one RB configuration applied or used to configure the at least one radio bearer for communication between the 5G base station 121 and the UE 111 (e.g., the at least one RB configuration for NR) (e.g., in a sourceRB-ConfigIntra5GC field of the HandoverPreparationInformation message).

In response to sending the Handover Request message, the 5G source base station 121 receives a Handover Request Acknowledge message from the E-UTRA target base station 122 that includes a radio bearer configuration based in part on the at least one radio bearer configuration. For example, the Handover Request Acknowledge message includes an E-UTRA Radio Resource Control (RRC) message, and the E-UTRA RRC message includes at least one configuration of E-UTRA for the at least one RB based on the at least one RB configuration for NR in the Handover Request message. The 5G source base station 121 transmits an RRC message (hereinafter referred to as NR RRC message) including the E-UTRA RRC message to the UE 111. The Handover Request message and the Handover Request Acknowledge message may be sent in Xn application protocol messages.

In another aspect, to communicate PDUs, using at least one RB, to the UE 111, the 5G base station 121 configures at least one RB based on at least one RB configuration. The 5G base station 121 transmits PDUs via the at least one RB to the UE 111. When the 5G source base station 121 determines to hand over the UE 111 to the E-UTRA target base station 122, the 5G source base station 121 sends a Handover Required message for the UE 111 to the AMF 152. The Handover Required message includes a Handover Preparation Information message and the Handover Preparation Information message includes the at least one RB configuration for NR.

In response to sending the Handover Required message, the 5G source base station 121 receives a Handover Command message from the AMF 152 that includes a radio bearer configuration based in part on the at least one radio bearer configuration. For example, the Handover Command message includes an E-UTRA RRC message and the E-UTRA RRC message includes at least one configuration of E-UTRA for the at least one RB based on the at least one RB configuration for NR in the Handover Required message. The 5G source base station 121 transmits a NR RRC message including the E-UTRA RRC message to the UE 111. The Handover Required message and the Handover Command message may be sent in NG application protocol messages.

In an aspect, in response to receiving the previously-described Handover Required message from a 5G source base station 121, the AMF 152 may send a Handover Request message, including the Handover Preparation Information message, to the E-UTRA target base station 122 via an NG interface 106. In response to receiving the Handover Request message, the E-UTRA target base station 122 may send a Handover Request Acknowledge message to the AMF 152. The Handover Request Acknowledge message includes the E-UTRA RRC message with at least one configuration of E-UTRA for the at least one RB based on the at least one RB configuration for NR in the Handover Required message. The AMF 152 sends the Handover Command message, including the E-UTRA RRC message, to the 5G base station 121 in response to the Handover Request Acknowledge message.

In another aspect, in response to receiving the previously-described Handover Required message from a 5G source base station 121, the AMF 152 may send a Relocation Request message, including the Handover Preparation Information message, to the MME 162 via an N26 interface 182. The MME 162 sends a Handover Request message, including the Handover Preparation Information message, to the E-UTRA target base station 122. The E-UTRA base station 122 may send a Handover Request Acknowledge message to the MME 162 in response to receiving the Handover Request message. The Handover Request Acknowledge message includes the E-UTRA RRC message with at least one RB configuration based on the at least one RB configuration for NR in the Handover Required message. The MME 162 sends a Forward Relocation Response message, including the E-UTRA RRC message, to the AMF 152. The AMF 152 sends the Handover Command message, including the E-UTRA RRC message, to the 5G base station 121 in response to receiving the Forward Relocation Response message.

Alternatively or additionally, the 5G base station 121 may determine to include or not include the RB configuration in the Handover Preparation Information message depending on a capability of a UE 110, or based on the target base station 120. For example, the UE 112 may have a different capability than the UE 111, or the base station 122 has an NG interface to AMF 152 but the E-UTRA base station 124 has no NG interface with AMF 152. To configure an RB and communicate PDUs using that RB to the UE 112, the 5G base station 121 configures a first RB configuration including a PDU Session identity and an RB identity. The 5G base station 121 determines to hand over the UE 112 to the E-UTRA base station 124, and sends a Handover Required message including a Handover Preparation Information message for the UE 112 to the AMF 152. The Handover Preparation Information message does not include the first RB configuration and instead the Handover Required message includes PDU Session information (e.g., a PDU Session Resource List). The PDU Session information may include the PDU Session identity. The AMF 152 sends a Forward Relocation Request message to the MME 162 using the N26 interface 182, in response to receiving the Handover Required message. The Forward Relocation Request message includes the Handover Preparation Information message and an Evolved Packet System (EPS) bearer identity associated to the PDU Session identity. The MME 162 sends a Handover Request message including the Handover Preparation Information and the EPS bearer identity to the E-UTRA base station 124 in response to receiving the Forward Relocation Request message. In response to receiving the Handover Request message, the E-UTRA base station 124 generates an E-UTRA RRC message to instruct the UE 112 to perform a handover to the E-UTRA base station 124. The E-UTRA RRC message includes a second RB configuration. The second RB configuration includes the EPS bearer identity and an RB identity. The RB identity may or may not be the same as the RB identity in the first RB configuration. The E-UTRA base station 124 sends a Handover Request Acknowledge message including the E-UTRA RRC message, to the MME 162 in response to the Handover Request message. The MME 162 sends a Forward Relocation Response message including the E-UTRA RRC message to the AMF 152. The AMF 152 sends a Handover Command message including the E-UTRA RRC message to the 5G base station 121. The 5G base station 121 transmits an NR RRC message including the E-UTRA RRC message to the UE 112 that is effective to cause the UE 112 to perform a handover to the E-UTRA base station 124. When the UE 112 connects to the E-UTRA base station 124, the UE 112 uses the second RB configuration instead of the first RB configuration to communicate PDUs with the E-UTRA base station 124.

In a further aspect, to communicate PDUs using an RB to the 5G base station 121, the UE 111 receives an RB configuration for NR from the 5G base station 121. The RB configuration for NR configures an RB and includes an RB identity. The UE 111 receives a NR RRC message including an E-UTRA RRC message from the 5G base station 121. Using the NR RRC message, the UE 111 configures itself to hand over to the base station 122. The E-UTRA RRC message includes an RB configuration of E-UTRA including a Radio Link Control configuration (RLC-Config) and the RB identity for the RB.

The UE 111 keeps using the RB configuration for NR in response to the NR RRC message or the E-UTRA RRC message. The UE 111 transmits an E-UTRA RRC response message to the base station 122 and uses the RLC-Config to transmit PDUs via the RB to the base station 122.

Unless the E-UTRA RRC message indicates to the UE 111 to release the at least one RB configuration for NR, the UE 111 keeps using the at least one RB configuration for NR. If the target base station 122 wants to release an RB configuration (for an RB) in the at least one RB configuration for NR, the base station 122 may include an RB release information element (IE) for NR or an RB release IE of E-UTRA in the E-UTRA RRC message. The release IE may include an RB identity in the RB configuration.

The Handover Preparation Information message may be an inter-node RRC message for E-UTRA. The PDUs may be Packet Data Convergence Protocol (PDCP) protocol data units (PDUs).

Each of the at least one RB configuration for NR may include an RB identity identifying one of the at least one RB. The RB identity may encompass a signaling RB (SRB) identity or a DRB identity.

The at least one RB may comprise at least one SRB. The at least one SRB may comprise an SRB 1 and/or an SRB 2. The at least one RB configuration for NR may comprise at least one SRB configuration (e.g., SRB-ToAddModList as defined in 3GPP TS 38.331) for the at least one SRB. For example, the at least one SRB configuration includes two SRB configurations. One of the two SRB configurations may be an SRB-ToAddMod as defined in 3GPP TS 38.331 and includes an SRB identity set to 1 for the SRB 1. The other one of the two SRB configurations may be an SRB-ToAddMod as defined in 3GPP TS 38.331 and includes an SRB identity set to 2 for the SRB 2. The base station 121 may transmit the SRB configuration for the SRB 1 to the UE 111 in an RRC Setup message. The base station 121 may transmit the SRB configuration for the SRB 2 to the UE 111 in a first RRC Reconfiguration message.

The at least one RB may comprise at least one data RB (DRB). The at least one RB configuration for NR may comprise at least one DRB configuration (e.g., DRB-ToAddModList as defined in 3GPP TS 38.331) for the at least one DRB. The base station 121 may transmit the at least one DRB configuration to the UE 111 in the first RRC Reconfiguration message or a second RRC Reconfiguration message before determining to hand over the UE 111 to the base station 122. For example, one of the at least one DRB configuration includes a DRB identity set to a value larger than 3 (e.g., a value in the range of 4-31) for a DRB in the at least one RB. The at least one DRB configuration may comprise a DRB configuration (e.g., DRB-ToAddMod as defined in 3GPP TS 38.331).

The at least one configuration of E-UTRA may comprise at least one RLC-Config associated to the at least one RB. For example, there may be a one-to-one association between one of the at least one RLC-Config and one of the at least one RB. The at least one configuration of E-UTRA may comprise at least one logical channel configuration (LogicalChannelConfig) associated to the at least one RB. For example, there may be a one-to-one association between one of the at least one LogicalChannelConfig and one of the at least one RB. The at least one configuration of E-UTRA may comprise at least one logical channel identity (LogicalChannelIdentity) associated to the at least one RB. For example, there is one association between one of the at least one LogicalChannelIdentity and one of the at least one RB.

The at least one configuration of E-UTRA may comprise at least one RB configuration of E-UTRA. In one example, the at least one RB configuration of E-UTRA may comprise a DRB configuration of E-UTRA for a DRB of the at least one RB. The DRB configuration of E-UTRA includes a DRB identity and an RLC-Config. The DRB identity is also in a DRB configuration for NR as part of the at least one RB configuration for NR. The RLC-Config may not be included in the DRB configuration for NR. For example, the DRB configuration of E-UTRA may comprise a DRB-ToAddMod as defined in 3GPP TS 36.331.

The base station 122 may configure the at least one RB configuration of E-UTRA according to the at least one RB configuration for NR. In one example, the base station 122 may set the value of the DRB identity in the DRB configuration of EUTRA to the value of the DRB identity in the DRB configuration for NR. In one example, the base station 122 configures the RLC-Config for the DRB configured by the at least one RB configuration for NR. The base station 122 may configure content of the RLC-Config according to quality of service (QoS) parameters associated to the DRB. The base station 122 may receive the QoS parameters in the Handover Request message (in an Xn, an NG, or an Si application protocol message) and not in the Handover Preparation Information message. Alternatively, the base station 122 may configure content of the RLC-Config to predetermined values.

In one example, the at least one RB configuration for NR may comprise the DRB configuration but does not comprise the SRB configuration. The base station 122 may configure the SRB configuration including an SRB identity and an RLC-Config in the E-UTRA RRC message. The base station 122 sets the SRB identity and content of the RLC-Config to predetermined values and uses the DRB configuration from the at least one RB configuration for NR to set the DRB configuration in the E-UTRA RRC message.

The at least one configuration of E-UTRA may also comprise other configurations, such as a random access channel (RACH) configuration, a physical layer configuration, and a Medium Access Control (MAC) configuration. The physical layer configuration may include at least one of: channel quality indication reporting configuration, physical uplink control channel (PUCCH) configuration, physical downlink shared channel (PDSCH) configuration, uplink power control configuration scheduling request configuration, sounding reference signal configuration, or antenna configuration. In one example, the base station 122 may configure the other configurations irrespective of the at least one RB configuration for NR. In one example, the base station 122 may configure the other configurations according to the at least one RB configuration for NR. In one example, the base station 122 may configure one of the other configurations irrespective of the at least one RB configuration for NR and configure one of the other configurations according to the at least one RB configuration for NR.

The target base station 122 seeks to communicate with the UE 111 according to the at least one configuration of E-UTRA. The base station 122 associates the RLC-Config to an RB (e.g., DRB or SRB) configured by an RB configuration of the at least one RB configuration for NR, if the RLC-Config and the RB configuration have the same RB identity (value). The base station 122 uses the RLC-Config to transmit PDUs via the RB to the UE 111. The base station 122 uses the RLC-Config to receive PDUs via the RB from the UE 111. In one example, the base station 122 establishes an RLC entity with the RLC-Config and associate the RLC entity to a PDCP entity associated to the RB.

When the UE 111 receives the NR RRC message from the source base station 121, the UE 111 extracts the E-UTRA RRC message from the NR RRC message. The UE 111 applies the at least one configuration in the E-UTRA RRC message to communicate with the target base station 122. For example, the UE 111 uses the RACH configuration to perform a random access procedure with the base station 122. The UE 111 transmits to the base station 122 an E-UTRA RRC response message responding to the E-UTRA RRC message. The UE 111 does not generate a NR RRC response message including the E-UTRA RRC response message and does not transmit the NR RRC response message to the base station 122 to respond to the NR RRC message.

The UE 111 keeps using the at least one RB configuration for NR in response to the E-UTRA RRC message. The UE 111 associates the RLC-Config to an RB configured by an RB configuration of the at least one RB configuration for NR, if the RLC-Config and the RB configuration have the same RB identity (value). The UE 111 uses the RLC-Config to transmit PDUs via the RB to the base station 122. The UE 111 uses the RLC-Config to receive PDUs via the RB from the base station 122. In one example, the UE 111 establishes an RLC entity with the RLC-Config and associate the RLC entity to a PDCP entity associated to the RB. The UE 111 may establish the PDCP entity before receiving the NR RRC message and keep using the PDCP entity in response to NR RRC message or E-UTRA RRC message.

The source base station 121 for NR may be a gNB and the target base station 122 may be a next generation-evolved Node B (ng-eNB). In one example, the base station 121 does not configure E-UTRA-NR dual connectivity (EN-DC) to the UE 111. The NR RRC message may be a Mobility From NR Command message and the E-UTRA RRC message may be an RRC Connection Reconfiguration message. The E-UTRA RRC response message may be an RRC Connection Reconfiguration Complete message.

In one example, the Handover Preparation Information message may not include an AS-Config which is an information element. The AS-Config includes a plurality of configurations for the UE 111. In one example, the source base station 121 may not get content of the AS-Config, as the source base station 121 is a 5G NR base station and the Handover Preparation Message is an LTE RRC inter-node message. If the Handover Preparation Information message includes the AS-Config, the target base station 122 may ignore and/or discard the AS-Config or ignore the plurality of configurations in the AS-Config. The plurality of configurations may have at least one of: measurement configuration (MeasConfig), radio resource configuration (RadioResourceConfigDedicated), Master Information Block (MasterInformationBlock), System Information Block Type 1 (SystemInformationBlockType1), System Information Block Type 2 (SystemInformationBlockType2), Antenna Information Common configuration (AntennaInfoCommon), or Absolute Radio Frequency Channel Number for E-UTRA (ARFCN-ValueEUTRA). The base station 122 does not take the plurality of configurations into account to generate the at least one configuration of E-UTRA.

In one example, the base station 121 may get the content of the AS-Config by a predetermined, predefined, and/or preconfigured means. For example, the base station 121 may be preconfigured with the AS-Config in which the plurality of configurations is never transmitted by the base station 121 to the UE 111. The target base station 122 may take the plurality of configurations into account to generate the at least one configuration of E-UTRA.

Example Methods

Example methods 300-500 are described with reference to FIGS. 3-5 in accordance with one or more aspects of transferring a radio bearer configuration. The order in which the method blocks are described are not intended to be construed as a limitation, and any number of the described method blocks can be combined in any order or skipped to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like.

Figure 3:
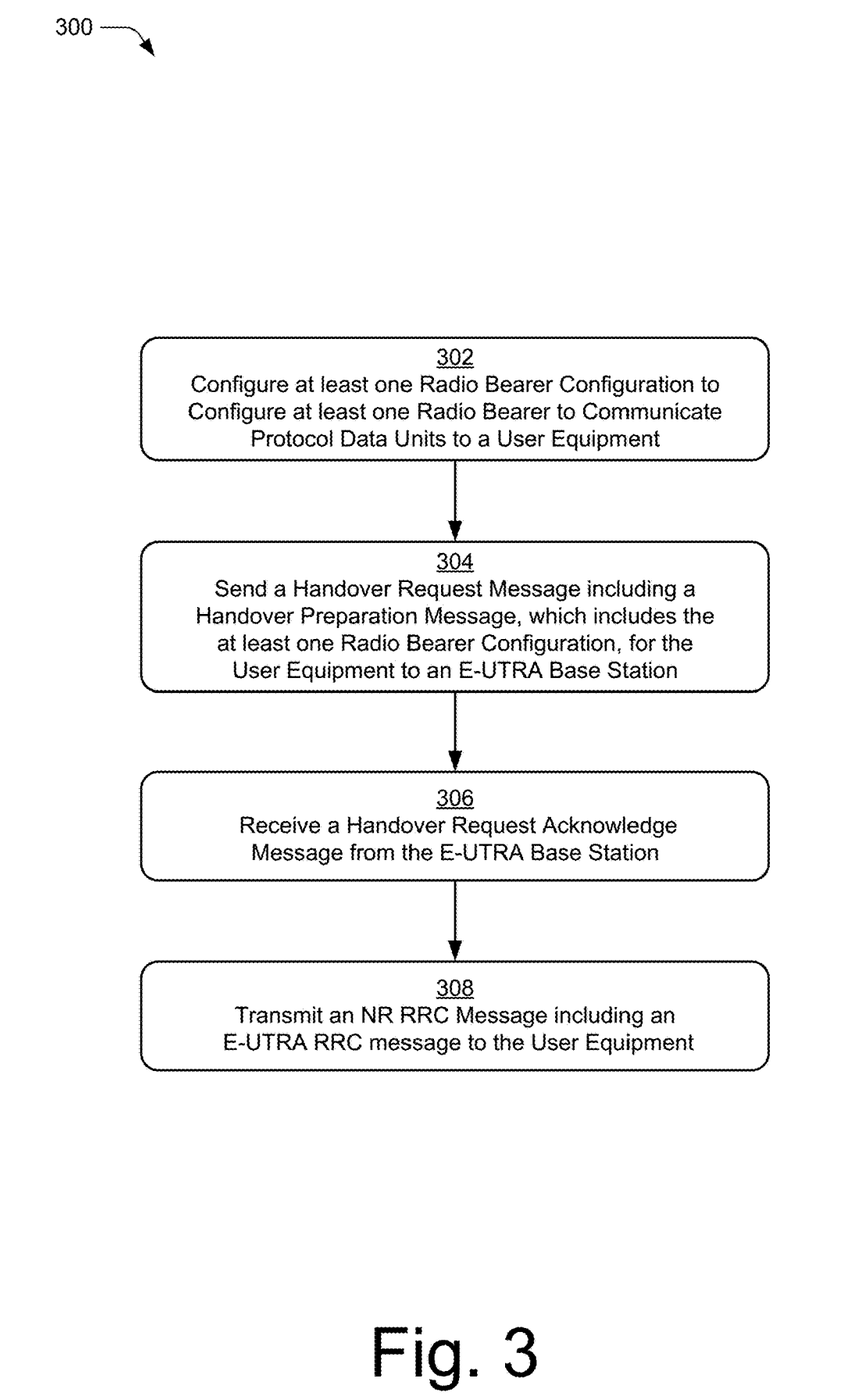
FIG. 3 illustrates an example method of transferring a radio bearer configuration as generally related to protocol processing by a base station in accordance with aspects of the techniques described herein.

FIG. 3 illustrates example method(s) 300 of transferring a radio bearer (RB) configuration as generally related to protocol processing by the base station 121 in accordance with aspects of the techniques described herein. At block 302, to communicate protocol data units (PDUs), using at least one RB, to a UE (e.g., the UE 111), a fifth-generation, 5G, (NR) base station (e.g., the base station 121) configures at least one RB configuration to configure at least one RB. For example, to communicate protocol data units (PDUs) using at least one RB to the UE 111, the 5G base station 121 configures at least one RB configuration for NR to configure at least one RB.

At block 304, the 5G base station determines to hand over the UE to an E-UTRA base station (e.g., the base station 122), and sends a Handover Request message including a Handover Preparation Information message for the UE to the E-UTRA base station, the Handover Preparation Information message including the at least one RB configuration for NR. For example, the 5G source base station 121 determines to hand over the UE 111 to the E-UTRA target base station 122 and sends a Handover Request message including a Handover Preparation Information message for the UE 111 to the E-UTRA base station 122, the Handover Preparation Information message including the at least one RB configuration.

At block 306, in response to sending the Handover Request message, the 5G base station receives a Handover Request Acknowledge message from the E-UTRA base station. For example, in response to sending the Handover Request message, the 5G source base station 121 receives a Handover Request Acknowledge message from the E-UTRA target base station 122 that includes a radio bearer configuration based in part on the at least one RB configuration.

At block 308, the 5G base station transmits a NR RRC message including an E-UTRA RRC message to the UE that is effective to cause the UE to perform a handover to the E-UTRA base station. For example, the 5G base station 121 transmits an NR RRC message including the E-UTRA RRC message to the UE 111 that is effective to cause the UE 111 to perform a handover to the E-UTRA base station 122.

Figure 4:
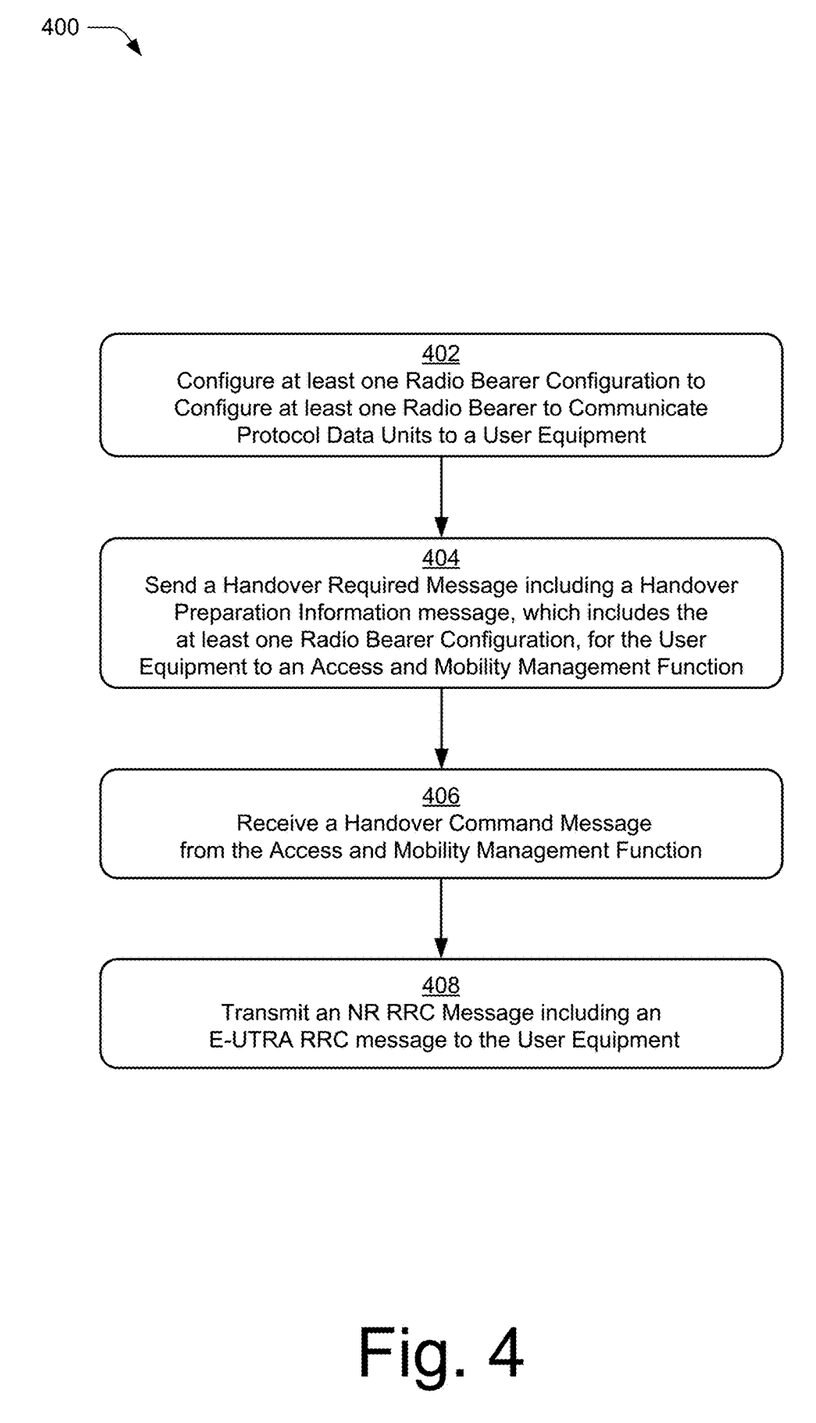
FIG. 4 illustrates an example method of transferring a radio bearer configuration as generally related to protocol processing by a base station in accordance with aspects of the techniques described herein.

FIG. 4 illustrates example method(s) 400 of transferring a radio bearer configuration as generally related to protocol processing by the base station 121 in accordance with aspects of the techniques described herein. At block 402, to communicate PDUs, using at least one RB, to a UE (e.g., the UE 111), a fifth-generation, 5G, (NR) base station (e.g., the base station 121) configures at least one RB in accordance with at least one RB configuration. For example, to communicate PDUs using an RB to the UE 111, the 5G base station 121 configures at least one RB with at least one RB configuration for NR.

At block 404, the 5G base station determines to hand over the UE to an E-UTRA base station (e.g., the base station 122), and sends a Handover Required message including a Handover Preparation Information message for the UE to an Access and Mobility Management Function (AMF) (e.g., the AMF 152), the Handover Preparation Information message including the at least one RB configuration. For example, the 5G source base station 121 determines to hand over the UE 111 to the E-UTRA target base station 122 and sends a Handover Required message including a Handover Preparation Information message for the UE 111 to the AMF 152, the Handover Preparation Information message including the at least one RB configuration for NR.

At block 406, in response to sending the Handover Required message, the 5G base station receives a Handover Command message from the AMF that includes a radio bearer configuration based in part on the at least one radio bearer configuration. For example, the Handover Command message includes an E-UTRA RRC message with at least one RB configuration for E-UTRA based on the at least one RB configuration for NR in the Handover Required message that enables the UE 110 to use the at least one RB with the E-UTRA target base station after the handover. For example, in response to sending the Handover Required message, the 5G base station 121 receives a Handover Command message from the AMF 152.

At block 408, the 5G base station transmits a NR RRC message including the E-UTRA RRC message to the UE that is effective to cause the UE to perform a handover to the E-UTRA base station. For example, the 5G base station 121 transmits a NR RRC message including the E-UTRA RRC message to the UE 111 that is effective to cause the UE 111 to perform a handover to the E-UTRA base station 122.

Figure 5:
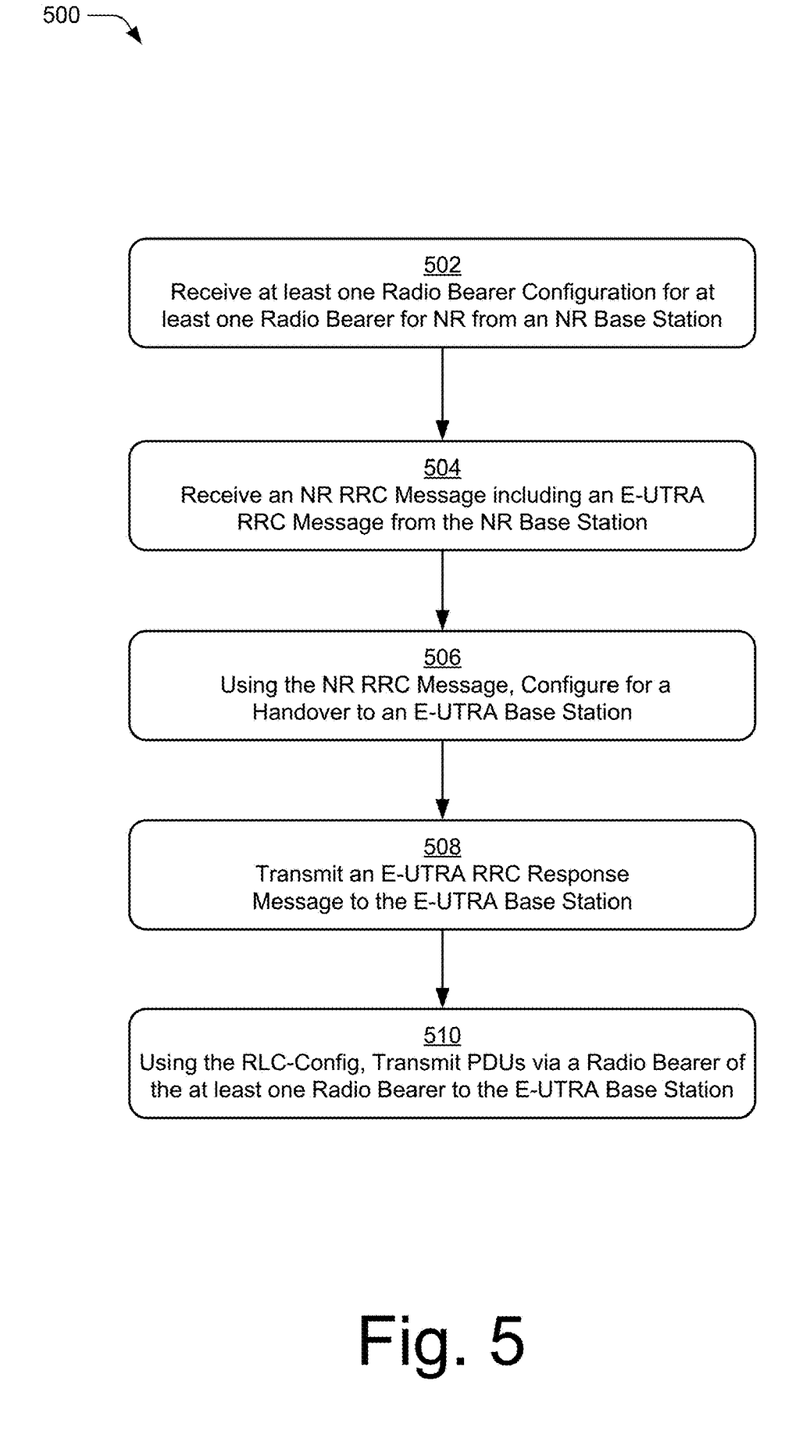
FIG. 5 illustrates an example method of transferring a radio bearer configuration as generally related to protocol processing by the user equipment in accordance with aspects of the techniques described herein.

FIG. 5 illustrates example method(s) 500 of transferring a radio bearer configuration as generally related to protocol processing by the UE 111 in accordance with aspects of the techniques described herein. At block 502, to communicate PDUs using at least one RB to a fifth-generation, 5G, (NR) base station (e.g., the base station 121), a UE (e.g., the UE 111) receives at least one RB configuration for NR from a 5G base station. For example, to communicate PDUs using at least one RB to the 5G base station 121, the UE 111 receives at least one RB configuration for NR from the 5G base station 121.

At block 504, the UE receives an NR RRC message including an E-UTRA RRC message from the 5G base station. For example, the UE 111 receives an NR RRC message including an E-UTRA RRC message from the 5G base station 121. The E-UTRA RRC message includes an RB configuration of E-UTRA including a Radio Link Control configuration (RLC-Config) and the RB identity for the RB.

At block 506, using the NR RRC message, the UE configures itself to hand over to an E-UTRA base station (e.g., the base station 122). Based on the NR RRC message, the UE 111 configures itself to hand over to a target base station 122.

At block 508, the UE keeps using the at least one RB configuration for NR in response to the NR RRC message or the E-UTRA RRC message, and transmits an E-UTRA RRC response message to the E-UTRA base station. For example, the UE 111 keeps using the at least one RB configuration for NR in response to the NR RRC message or the E-UTRA RRC message, and transmits an E-UTRA RRC response message to the base station 122

At block 510, the UE uses the RLC-Config to transmit PDUs via at least one RB to the E-UTRA base station. For example, the UE 111 uses the RLC-Config to transmit PDUs via at least one RB to the base station 122.

In the following some examples are described—

Example 1

A method of transferring a radio bearer configuration, the method comprising a fifth-generation base station:
applying at least one radio bearer configuration to configure at least one radio bearer for communication of Protocol Data Units between the fifth-generation base station and a user equipment;
determining to hand over the user equipment to an Evolved Universal Terrestrial Radio Access base station;
based on the determining to hand over the user equipment, sending a Handover Request message including a Handover Preparation Information message to the Evolved Universal Terrestrial Radio Access base station, the Handover Preparation Information message including the at least one radio bearer configuration;
in response to sending the Handover Request message, receiving a Handover Request Acknowledge message from the Evolved Universal Terrestrial Radio Access base station that includes a radio bearer configuration based in part on the at least one radio bearer configuration; and
transmitting a Radio Resource Control message including an Evolved Universal Terrestrial Radio Access Radio Resource Control message to the user equipment that is effective to cause the user equipment to perform a handover to the Evolved Universal Terrestrial Radio Access base station.

Example 2

The method of example 1, further comprising the fifth-generation base station:
transmitting Protocol Data Units to the user equipment using the at least one radio bearer.

Example 3

The method of any one of the preceding examples, wherein the Handover Preparation Information message is a HandoverPreparationInformation message, wherein the HandoverPreparationInformation message comprises a sourceRB-ConfigIntra5GC field, and wherein the sourceRB-ConfigIntra5GC field includes the at least one radio bearer configuration.

Example 4

The method of any one of the preceding examples, wherein the Handover Request Acknowledge message includes the Evolved Universal Terrestrial Radio Access Radio Resource Control message, and wherein the Evolved Universal Terrestrial Radio Access Radio Resource Control message includes the radio bearer configuration based in part on the at least one radio bearer configuration.

Example 5

The method of any one of the preceding examples, wherein the Handover Request message and the Handover Request Acknowledge message are sent in Xn application protocol messages.

Example 6

A method of transferring a radio bearer configuration, the method comprising a fifth-generation base station:
applying at least one radio bearer configuration to configure at least one radio bearer for communication of Protocol Data Units between the fifth-generation base station and a user equipment;
determining to hand over the user equipment to an Evolved Universal Terrestrial Radio Access base station;
based on the determining to hand over the user equipment, sending a Handover Required message including a Handover Preparation Information message for the user equipment to an Access and Mobility Management Function, the Handover Preparation Information message including the at least one radio bearer configuration;
in response to sending the Handover Required message, receiving a Handover Command message from the Access and Mobility Management Function that includes a radio bearer configuration based in part on the at least one radio bearer configuration; and
transmitting a Radio Resource Control message including an Evolved Universal Terrestrial Radio Access Radio Resource Control message to the user equipment that is effective to cause the user equipment to perform a handover to the Evolved Universal Terrestrial Radio Access base station.

Example 7

The method of example 6, further comprising the fifth-generation base station:
transmitting Protocol Data Units to the user equipment using the at least one radio bearer.

Example 8

The method of example 6 or example 7, wherein the Handover Preparation Information message is a Handover-PreparationInformation message, wherein the Handover-PreparationInformation message comprises a sourceRB-ConfigIntra5GC field, and wherein the sourceRB-ConfigIntra5GC field includes the at least one radio bearer configuration.

Example 9

The method of any one of examples 6 to 8, wherein the sending the Handover Required message to the Access and Mobility Management Function directs the Access and Mobility Management Function to send a Handover Request message including the Handover Preparation Information message to the Evolved Universal Terrestrial Radio Access base station.

Example 10

A base station comprising:
a wireless transceiver;
a core network interface;
an inter-base station interface;
a processor; and
instructions for a base station manager that are executable by the processor to configure the base station to perform any one of the preceding examples.

Example 11

A method of transferring a radio bearer configuration, the method comprising a user equipment:
receiving at least one radio bearer configuration to configure at least one radio bearer for communication of Protocol Data Units between a fifth-generation base station and the user equipment;
receiving a Radio Resource Control message including an Evolved Universal Terrestrial Radio Access Radio Resource Control message from the fifth-generation base station, the Evolved Universal Terrestrial Radio Access Radio Resource Control message including a Radio Link Control configuration;
based on the received Radio Resource Control message, configuring for a handover to an Evolved Universal Terrestrial Radio Access base station; and
transmitting an Evolved Universal Terrestrial Radio Access Radio Resource Control response message to the Evolved Universal Terrestrial Radio Access base station.

Example 12

The method of example 11, further comprising the user equipment:
transmitting Protocol Data Units to the fifth-generation base station using the at least one radio bearer.

Example 13

The method of example 11 or example 12, further comprising the user equipment:
using the Radio Link Control configuration to transmit Protocol Data Units to the Evolved Universal Terrestrial Radio Access base station using a radio bearer of the at least one radio bearer.

Example 14

The method of any one of examples 11 to 13, wherein the Radio Link Control configuration is associated with at least one radio bearer.

Example 15

A user equipment comprising:
a wireless transceiver;
a processor; and
instructions for a handover manager that are executable by the processor to configure the user equipment to perform any one of examples 11 to 14.

CONCLUSION

Although aspects of transferring a radio bearer configuration have been described in language specific to features and/or methods, the subject of the appended claims is not necessarily limited to the specific features or methods described. Rather, the specific features and methods are disclosed as example implementations of the transferring a radio bearer configuration, and other equivalent features and methods are intended to be within the scope of the appended claims. Further, various different aspects are described, and it is to be appreciated that each described aspect can be implemented independently or in connection with one or more other described aspects.

What is claimed is:

1. A method of transferring a radio bearer configuration, the method comprising a source fifth-generation base station:
   applying at least one first radio bearer configuration to configure at least one radio bearer for communication of Protocol Data Units between the source fifth-generation base station and a user equipment, the at least one first radio bearer configuration including a Protocol Data Unit (PDU) Session Identity and a radio bearer identity different from the PDU Session Identity;
   sending a Handover Request message including a Handover Preparation Information message to a target Evolved Universal Terrestrial Radio Access base station, the Handover Preparation Information message including a sourceRB-ConfigIntra5GC field that includes the at least one first radio bearer configuration;
   in response to sending the Handover Request message, receiving a Handover Request Acknowledge message from the Evolved Universal Terrestrial Radio Access base station that includes an Evolved Universal Terrestrial Radio Access Radio Resource Control (RRC) message including a second radio bearer configuration based in part on the at least one first radio bearer configuration; and
   transmitting a Radio Resource Control message including the Evolved Universal Terrestrial Radio Access Radio Resource Control message to the user equipment.

2. The method of claim 1, further comprising the source fifth-generation base station:
   transmitting Protocol Data Units to the user equipment using the at least one radio bearer.

3. The method of claim 1, wherein the Handover Preparation Information message is a HandoverPreparationInformation message.

4. The method of claim 1, wherein the Handover Request message and the Handover Request Acknowledge message are sent in Xn application protocol messages.

5. The method of claim 1, wherein the sending the Handover Request message including the Handover Preparation Information message comprises:
   determining to include the at least one radio bearer configuration in the Handover Preparation Information message based on a capability of the user equipment.

6. The method of claim 1, wherein the at least one radio bearer is a Data Radio Bearer (DRB) or a Signaling Radio Bearer (SRB).

7. The method of claim 1, wherein the radio bearer configuration includes:
   a Radio Bearer (RB) identity for a Radio Bearer; or
   a logical channel configuration (LogicalChannelConfig).

8. The method of claim 1, wherein the Handover Preparation Information message does not include an Access Stratum Configuration (AS-Config).

9. The method of claim 1, wherein the Handover Preparation Information message includes an Access Stratum Configuration (AS-Config), and wherein the AS-Config includes a plurality of configurations, and wherein the plurality of configurations includes at least one of a measurement configuration (MeasConfig) or a radio resource configuration (RadioResourceConfigDedicated).

10. A method of transferring a radio bearer configuration, the method comprising a source fifth-generation base station:
    applying at least one radio bearer configuration to configure at least one radio bearer for communication of Protocol Data Units between the source fifth-generation base station and a user equipment;
    sending a Handover Required message including a Handover Preparation Information message for the user equipment to an Access and Mobility Management Function, the Handover Preparation Information message including a sourceRB-ConfigIntra5GC field that includes the at least one radio bearer configuration for communication of Protocol Data Units between the source fifth-generation base station and the user equipment, the at least one radio bearer configuration including a Protocol Data Unit (PDU) Session Identity and a radio bearer identity, the PDU Session Identity being different than the radio bearer identity;
    in response to sending the Handover Required message, receiving a Handover Command message from the Access and Mobility Management Function that includes an Evolved Universal Terrestrial Radio Access RRC message including a radio bearer configuration based in part on the at least one radio bearer configuration for communication of Protocol Data Units between the source fifth-generation base station and the user equipment; and
    transmitting a Radio Resource Control message including the Evolved Universal Terrestrial Radio Access Radio Resource Control message to the user equipment that is effective to cause the user equipment to perform a handover to a target Evolved Universal Terrestrial Radio Access base station.

11. The method of claim 10, further comprising the source fifth-generation base station:
    transmitting Protocol Data Units to the user equipment using the at least one radio bearer.

12. The method of claim 10, wherein the Handover Preparation Information message is a HandoverPreparationInformation message.

13. The method of claim 10, wherein the sending the Handover Required message to the Access and Mobility Management Function directs the Access and Mobility Management Function to send a Handover Request message including the Handover Preparation Information message to the Evolved Universal Terrestrial Radio Access base station.

14. The method of claim 10, wherein the sending the Handover Required message to the Access and Mobility Management Function directs the Access and Mobility Management Function to send a Relocation Request message, including the Handover Preparation Information message, to a Mobility Management Entity.

15. The method of claim 10, wherein the sending the Handover Required message including the Handover Preparation Information message comprises:
    determining to include the at least one radio bearer configuration in the Handover Preparation Information message based on a capability of the user equipment.

16. The method of claim 10, wherein the at least one radio bearer is a Data Radio Bearer (DRB) or a Signaling Radio Bearer (SRB).

17. A method of transferring a radio bearer configuration, the method comprising a user equipment:
    receiving at least one radio bearer configuration to configure at least one radio bearer for communication of Protocol Data Units between a source fifth-generation base station and the user equipment, the at least one radio bearer configuration including a data radio bearer (DRB) identity and a signaling radio bearer (SRB) identity;
    receiving a Radio Resource Control message including an Evolved Universal Terrestrial Radio Access Radio Resource Control message from the source fifth-generation base station, the Evolved Universal Terrestrial Radio Access Radio Resource Control message including at least one Radio Link Control configuration associated with the at least one radio bearer;
    associating the at least one Radio Link Control configuration to the at least one radio bearer of the at least one radio bearer configuration based on the at least one Radio Link Control configuration and the at least one radio bearer configuration having the same radio bearer identity;
    based on the received Radio Resource Control message, configuring for a handover to a target Evolved Universal Terrestrial Radio Access base station; and
    transmitting an Evolved Universal Terrestrial Radio Access Radio Resource Control response message to the target Evolved Universal Terrestrial Radio Access base station.

18. The method of claim 17, further comprising the user equipment:
    transmitting Protocol Data Units to the source fifth-generation base station using the at least one radio bearer.

19. The method of claim 18, further comprising the user equipment:
    using the Radio Link Control configuration to transmit Protocol Data Units to the target Evolved Universal Terrestrial Radio Access base station using a radio bearer of the at least one radio bearer.

20. The method of claim 17, wherein the at least one radio bearer configuration configures a first radio bearer and a second radio bearer, the method further comprising the user equipment:
    transmitting Protocol Data Units to the source fifth-generation base station using the first radio bearer; and
    transmitting Protocol Data Units to the target Evolved Universal Terrestrial Radio Access base station using the second radio bearer.

* * * * *

UNITED STATES PATENT AND TRADEMARK OFFICE
CERTIFICATE OF CORRECTION

Page 1 of 2

PATENT NO. : 11,706,670 B2
APPLICATION NO. : 16/531499
DATED : July 18, 2023
INVENTOR(S) : Chih-Hsiang Wu It is certified that error appears in the above-identified patent and that said Letters Patent is hereby corrected as shown below:

In the Claims

Column 17, Line 48, Claim 2, after "one" before "radio" enter --first--
Column 17, Line 58, Claim 5, after "one" before "radio" enter --first--
Column 17, Line 61, Claim 6, after "one" before "radio" enter --first--
Column 18, Line 16, Claim 10, after "one" before "radio" enter --first--
Column 18, Line 25, Claim 10, after "one" before "radio" enter --first--
Column 18, Lines 25-28, Claim 10, after "bearer" before "the" delete "configuration for communication of Protocol Data Units between the source fifth-generation base station and the user equipment" enter --configuration,--
Column 18, Line 30, Claim 10, after "bearer" before "the" delete "identity," enter --identity different from--
Column 18, Lines 30-32, Claim 10, after "Session" before "in" delete "being different than the radio bearer identity;" enter --Identity:--
Column 18, Lines 35-36, Claim 10, after "Access" before "message" delete "RRC" enter --Radio Resource Control (RRC)--
Column 18, Line 36, Claim 10, after "a" before "radio" enter --second--
Column 18, Line 37, Claim 10, after "one" before "radio" enter --first--
Column 18, Lines 37-41, Claim 10, after "bearer" before "transmitting" delete "configuration for communication of Protocol Data Units between the source fifth-generation base station and the user equipment; and" enter --configuration; and--
Column 18, Lines 44-48, Claim 10, after "user" before "11." delete "equipment that is effective to cause the user equipment to perform a handover to a target Evolved Universal Terrestrial Radio Access base station" enter --equipment.--
Column 18, Line 51, Claim 11, after "one" before "radio" enter --first--
Column 18, Lines 60-61, Claim 13, after "to" before "Evolved" delete "the" enter --an--
Column 19, Line 4, Claim 15, after "one" before "radio" enter --first--
Column 19, Line 7, Claim 16, after "one" before "radio" enter --first--
Column 19, Lines 17-18, Claim 17, after "identity;" before "a" delete "receiving" enter --receiving, from the source fifth-generation base station,--

Signed and Sealed this
Twelfth Day of September, 2023

Katherine Kelly Vidal
*Director of the United States Patent and Trademark Office*

Column 19, Lines 20-23, Claim 17, after "message" before "including" delete "from the source fifth-generation base station, the Evolved Universal Terrestrial Radio Access Radio Resource Control message"

Column 19, Lines 24-25, Claim 17, after "radio" before "associating" delete "bearer;" enter --bearer,--

Column 19, Lines 24-27, Claim 17, after "bearer;" before "based" delete "associating the at least one Radio Link Control configuration to the at least one radio bearer of the at least one radio bearer configuration" enter --the association--